L. ONDERDONK & A. J. WOHLPART.
RUFFLING SEWING MACHINE.
APPLICATION FILED OCT. 21, 1915.
1,296,550.
Patented Mar. 4, 1919.
6 SHEETS—SHEET 5.
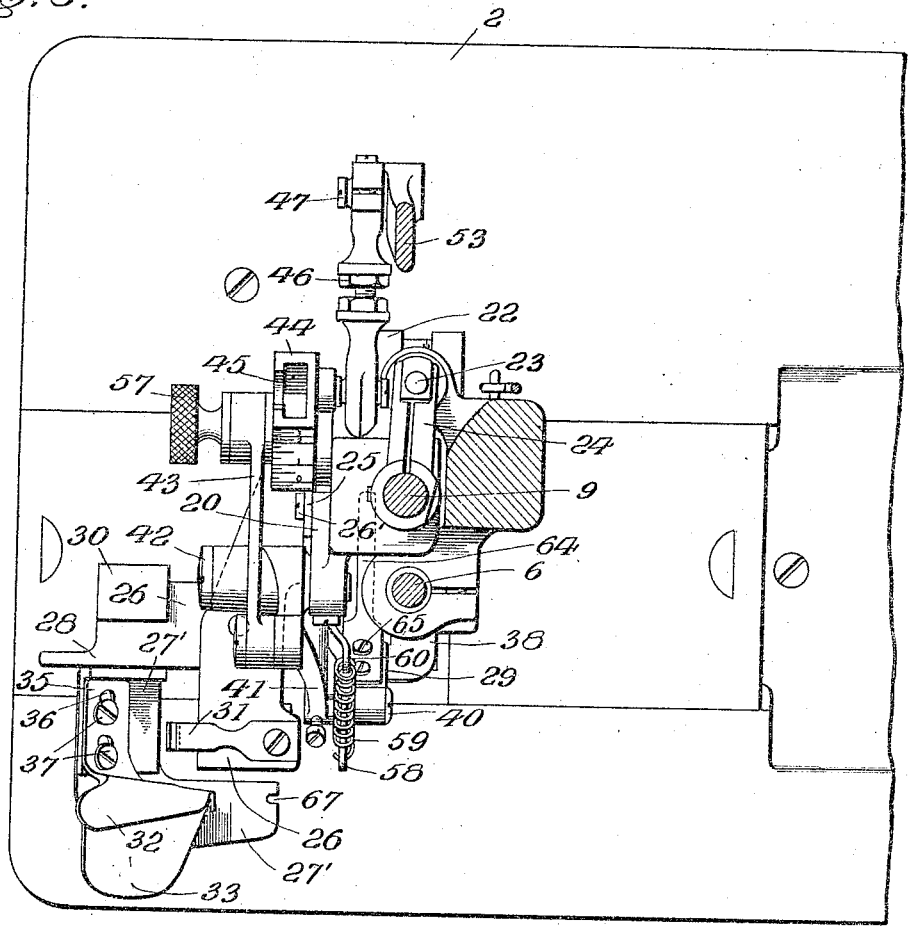
Fig. 5.
Fig. 11.
Fig. 12.
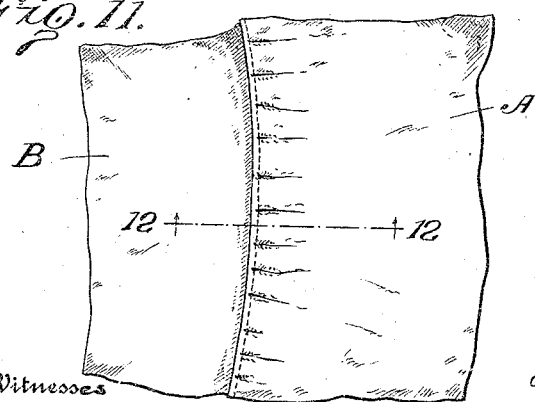
Witnesses
Albert Popkins
B B Thompson
Inventors
Lansing Onderdonk
August J. Wohlpart
By Sturtevant Mason
Attorneys

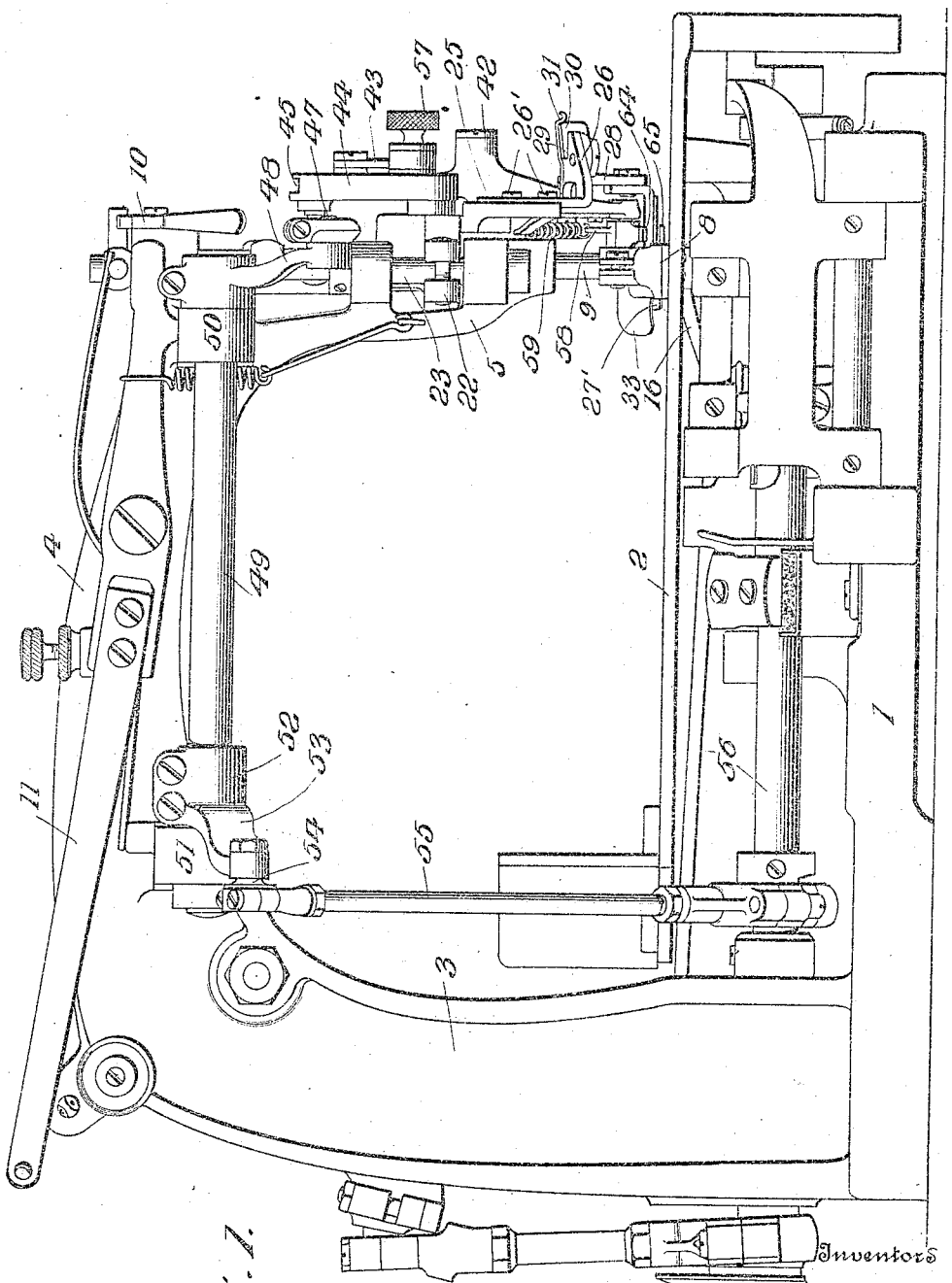

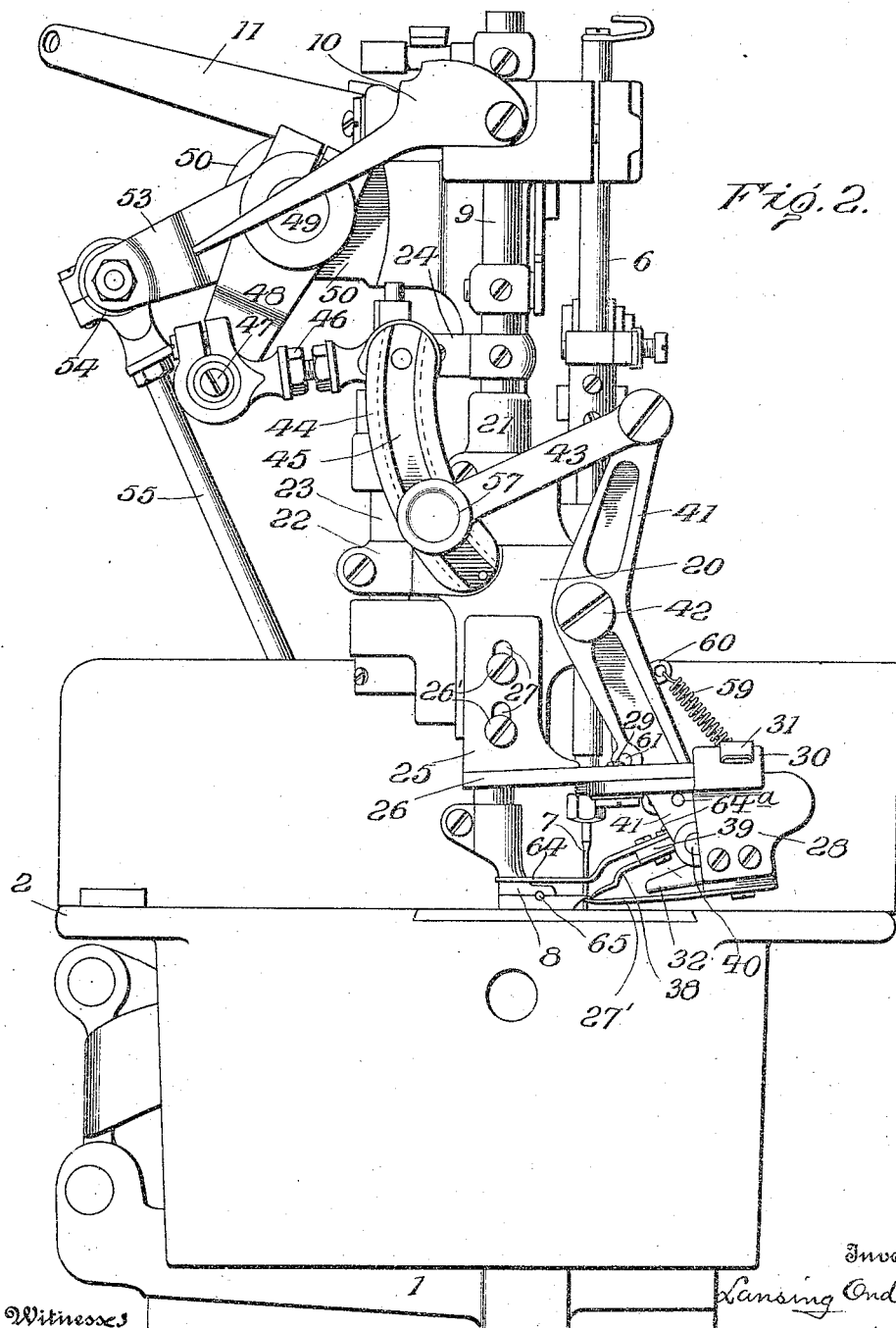

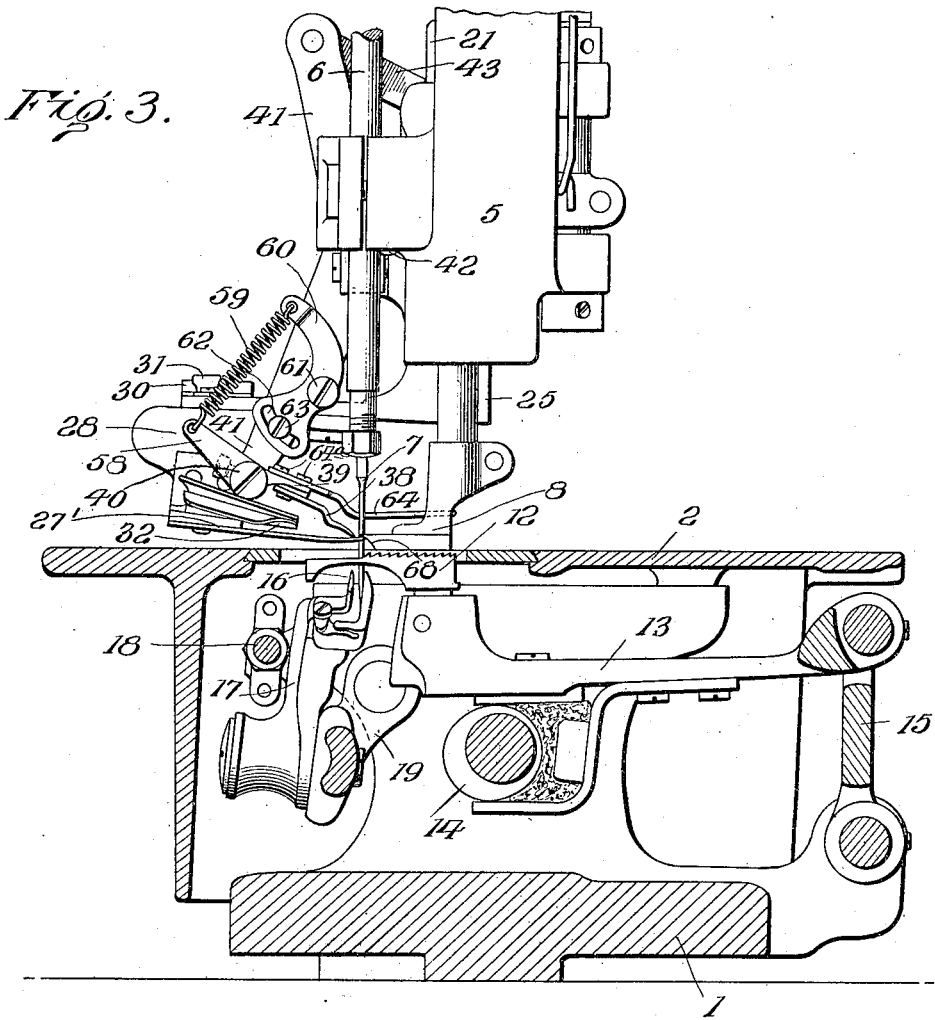

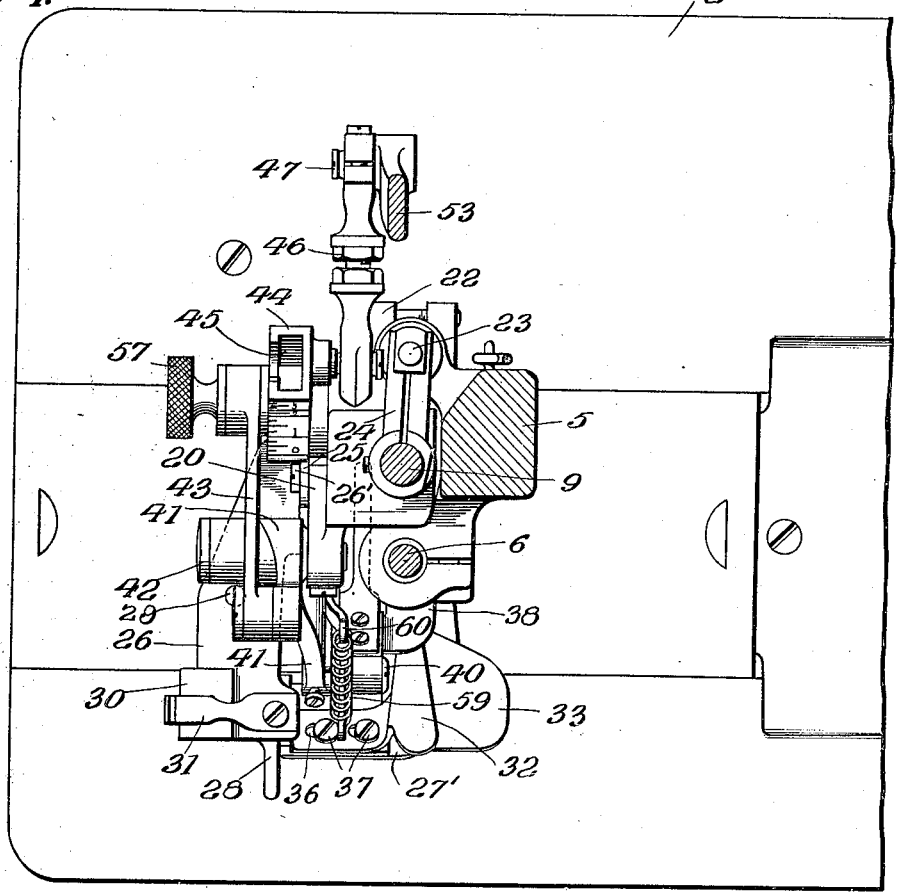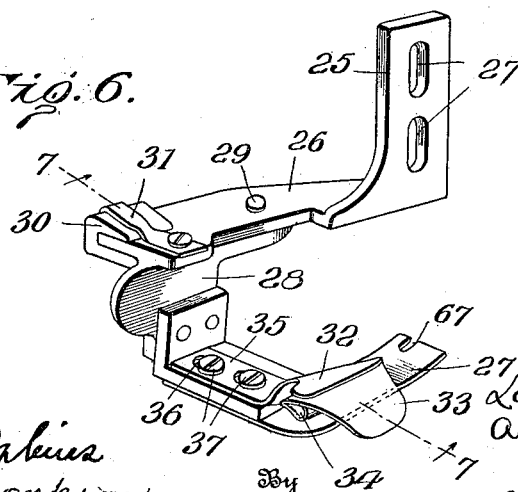

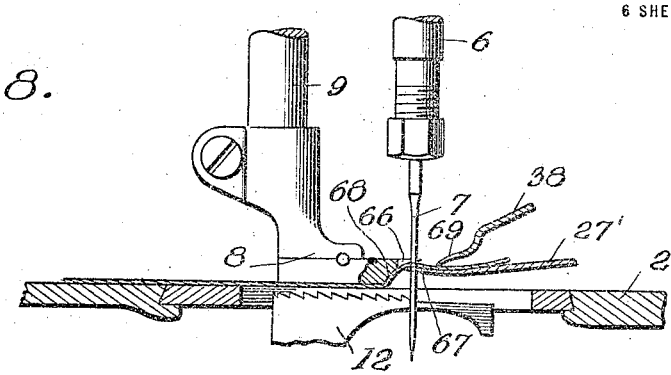
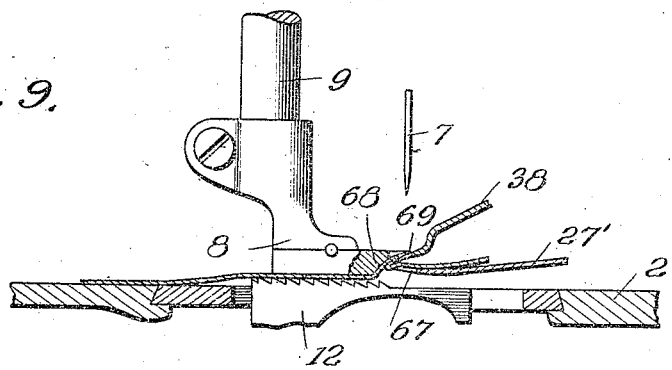
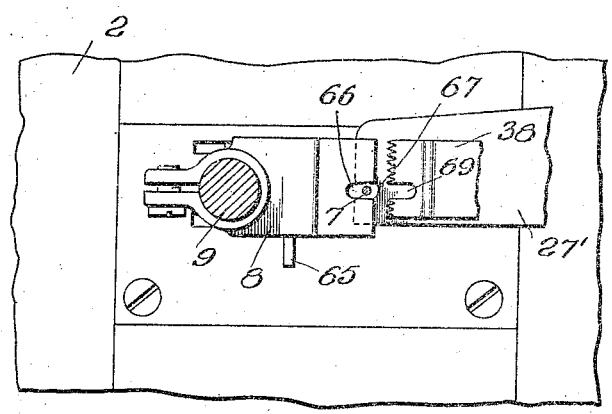

UNITED STATES PATENT OFFICE.

LANSING ONDERDONK AND AUGUST J. WOHLPART, OF NEW YORK, N. Y., ASSIGNORS TO UNION SPECIAL MACHINE COMPANY, OF CHICAGO, ILLINOIS, A CORPORATION OF ILLINOIS.

RUFFLING SEWING-MACHINE.

1,296,550.  Specification of Letters Patent.  Patented Mar. 4, 1919.

Application filed October 21, 1915. Serial No. 57,090.

*To all whom it may concern:*

Be it known that we, LANSING ONDERDONK and AUGUST J. WOHLPART, citizens of the United States, residing at New York, in the county of New York, State of New York, have invented certain new and useful Improvements in Ruffling Sewing-Machines, of which the following is a description, reference being had to the accompanying drawing, and to the figures of reference marked thereon.

The invention relates to new and useful improvements in sewing machines which are adapted for ruffling or gathering one piece of material and stitching the same to another.

An object of the invention is to provide a ruffling sewing machine of the above character with means for folding the edge of an upper section of fabric and means for supporting said upper section of fabric while the same is being gathered or ruffled as it is fed to the stitching mechanism, which folding and supporting means may be turned to one side and out of engagement with said upper section of fabric to permit a completion of the sewing in connection with circular fabric sections.

A further object of the invention is to provide a ruffling machine of the above character with a presser foot which coöperates with the supporting means and the ruffling blade in the gathering or the ruffling of the fabric section.

A still further object of the invention is to provide a ruffling mechanism wherein the ruffling blade may be mounted on the overhanging arm of the machine and positively operated from a rock shaft also mounted on the overhanging arm and extending lengthwise thereof by a connection directly with the forward end of said rock shaft.

These and other objects will in part be obvious and will in part be hereinafter more fully disclosed.

In the drawings, which show by way of illustration one embodiment of the invention:—

Figure 1 is a rear view of a ruffling machine having our improvements applied thereto;

Fig. 2 is an end view of the same, certain of the parts being omitted;

Fig. 3 is a view in vertical section at one side of the presser foot through the work support and showing a portion of the supporting head at the forward end of the overhanging arm;

Fig. 4 is a view partly in section and partly in plan showing the manner of supporting the ruffling mechanism on the head at the forward end of the overhanging arm;

Fig. 5 is a similar view but showing the separating blade and folder moved to inoperative position to permit the finishing of the stitching of an article;

Fig. 6 is a perspective view of the supporting bracket, the folder and the separating blade carried thereby;

Fig. 7 is a sectional view on the line 7—7 of Fig. 6;

Fig. 8 is a view showing, more or less diagrammatically, the work support, the presser foot, the feed dog, the separating blade, and the gathering blade, said gathering blade being in its extreme rear position;

Fig. 9 is a similar view but showing the gathering blade at the forward end of its stroke and the presser foot slightly raised through the action of the feed;

Fig. 10 is a plan view of the parts shown in Fig. 8;

Fig. 11 is a detail in plan showing two sections of fabric joined by our improved mechanism;

Fig. 12 is a sectional view on the line 12—12 of Fig. 11.

The invention consists generally in a ruffling mechanism which is supported entirely by the head at the forward end of the overhanging arm, said ruffling mechanism comprising a ruffling blade, a lever supporting the same, a rock arm for actuating said lever, which rock arm is in turn oscillated by the rock shaft extending lengthwise of the overhanging arm. The fabric to be ruffled or gathered is supported by a separating blade which is mounted on a bracket also attached to the head at the forward end of the overhanging arm. A folder is also mounted on this bracket which may be used for turning the edge of the material which is to be ruffled or gathered. This supporting of all the parts from the overhanging arm permits a fabric to be fed underneath the folder and separating blade and an upper section of the fabric gathered and stitched thereto. The presser foot is located almost wholly in rear of the needle, the front end thereof being notched for giving clearance to said needle. The front end of the foot is also cut-away underneath so as to coöperate with the ruffling blade and the separating blade in the forming of the ruffles in the fabric.

Referring more in detail to the drawings, our improved ruffling machine consists of a supporting bed 1, carrying a work support 2, and a standard 3 terminating in an overhanging arm 4 carrying a supporting head 5 at its outer free end. A needle bar 6 is mounted to reciprocate in this supporting head and is actuated in the usual manner. This needle bar, as herein shown, carries a single needle 7. The material to be operated upon is held on the work support by a presser foot 8 which is mounted on a presser bar 9 carried by the supporting head 5. Said presser bar may be raised either by a hand lever 10 or a treadle controlled lever 11. The material is fed underneath the presser foot by a feed dog 12 which is mounted on a feed bar 13. Said feed bar is raised and lowered by an eccentric 14 and is moved back and forth by a feed rocker 15. Coöperating with the needle beneath the work support is a looper 16 mounted on a looper carrier 17 which is oscillated by a link 18. This looper carrier is in turn mounted on a looper support 19. The parts so far stated are of the usual construction and further detailed description thereof is not thought necessary.

Supported by the head 5 is a bracket 20. This bracket is provided with a sleeve 21 which surrounds the presser bar, and with a rearwardly projecting forked arm 22 which is clamped to the guide bar 23 fixed to the head 5. This guide bar 23 is also engaged by a forked arm 24 carried by the presser bar 9, which arm slides up and down on the guide bar. The bracket is, by the above means, rigidly held to the head and has no movement whatever with the presser bar. This bracket adjustably supports an arm 25. Screws 26' pass through slots 27 in the arm into the bracket 20. This permits of a limited vertical adjustment of the arm 25. Said arm 25 is bent to form a horizontal section 26.

A separating blade 27' is mounted on an arm 28 which extends laterally from the separating blade and thence upwardly and forwardly and is pivoted at 29 to the horizontal section 26 of the arm 25. The arm carrying the separating blade may be readily swung about this pivotal point 29. Said arm 28 has a backwardly bent portion 30 which overlaps the plate 26, and this makes a rigid support for the arm 28. A spring clip 31 engages the portion 30 and holds the parts in the position shown in Fig. 6. When in this position, the separating blade is located in the line of feed with the free end thereof projecting beneath the overhanging portion of the presser foot.

Mounted on the arm 28 is a folder 32 having a receiving plate 33 and a folding scroll 34. This folder is adapted to turn the edge of the fabric and direct the folded edge thereof over the upper face of the separating blade 27'. The supporting shank 35 of the folder 32 is formed with slots 36 through which screws 37 pass for clamping the folder to the arm. By supporting the folder on the arm 38, said folder and separating blade may be moved together from operative position to inoperative position at one side of the line of feed, as shown in Fig. 5 of the drawings.

A ruffling blade 38 is clamped to a rock arm 39 which is pivoted at 40 to a lever 41. The lever 41 is pivoted at 42 to the bracket 20 and extends upwardly above this pivotal point. The upper end of said lever is connected to a link 43. Also mounted on the bracket 20 is a segmental arm 44 having a segmental slot 45 in its outer face. This segmental arm is pivoted at its lower end to the bracket 20. The upper end of the segmental arm is connected to a link 46 which in turn is connected at 47 to an arm 48 carried by a rock shaft 49. The rock shaft 49, as shown in Fig. 1, is mounted in bearings 50 and 51 carried by the overhanging arm. A collar 52 is clamped to the rear end of the rock shaft 49 and has a rearwardly extending arm 53 carrying a ball stud 54. A link 55 engages said ball stud 54 at its upper end and coöperates at its lower end with an eccentric on the main shaft 56. A sliding T-shaped block is mounted in the segmental slot 45 which is preferably T-shaped in cross section so as to support the block and, at the same time, permit the same to be moved along said slot. A thumb nut 57 clamps the block in an adjusted position and the link 43 has a pivotal connection with said block.

From the above description, it will be apparent that as the main shaft rotates the rock shaft 49 will be oscillated. This will in turn oscillate the segmental arm 44 which, through the link 43, will oscillate the lever 41, and this will vibrate the ruffling blade back and forth. As above noted, the rock arm 39 carrying the ruffling blade is pivoted at 40 to the lever 41. Said rock arm has a forwardly projecting arm 58. A spring 59 is connected at one end to the arm 58 and is connected at its other end to an adjustable bracket 60 pivoted at 61 to the lever 41. Said bracket 60 has a slot 62 formed therein, and a set-screw 63 passes through said slot and holds the bracket in an adjusted position. By shifting the bracket the tension of the spring 59 may be changed. This spring normally presses the ruffling blade 38 against the separating blade 27'. Said rock arm 39 is provided with a projecting finger 64 which is clamped thereto by suitable screws 64ª. This projecting finger 64 extends alongside of the presser foot and above a pin 65 mounted thereon. When the presser foot is raised through the hand lever 10 or the treadle controlled lever 11, the pin 65 will engage the finger 64, thus swinging the rock arm 39 and lifting the ruffling blade 38 from engagement with the separating blade. This facilitates the insertion of the material through the folder over the separating blade and underneath the work support.

The presser foot 8 has a slot 66 formed in its forward end which serves as a clearance space for the needle. The separating blade is also formed with a needle slot 67, see Fig. 6, so that this separating blade may project underneath the overhanging end of the presser foot formed by cutting the same away at 68. The ruffling blade 38 is also formed with a needle slot or recess 69 which will permit the ruffling blade to move rearwardly until its forward end is slightly beyond the path of the needle.

The bracket 25 supporting the separating blade may be adjusted vertically, as above noted, and is preferably set so as to form a clear space underneath the same, as shown in Figs. 2 and 3. This permits the body fabric, indicated at B in Fig. 11, to be fed underneath the separating blade and operated upon by the feed and presser foot. A section of fabric, indicated at A in Fig. 11, is passed through the folder and over the separating blade, and then underneath the presser foot. The ruffling blade 38 presses solely upon this upper section of the fabric A. In Fig. 8 the ruffling blade is shown at the rear end of its stroke. This ruffling blade moves in timing with the feed dog. As the feed dog raises the presser foot, as shown in Fig. 9, the ruffling blade moves to the forward end of its stroke, gathering the upper section of fabric and forcing the same between the forward end of the separating blade and the undercut surface of the presser foot. As the presser foot descends, when the feed drops, the gathered fabric will be held by the presser foot and separating blade, also by the ruffling blade. Said ruffling blade is timed so as to be given its retracting movements just after the point of the needle engages the fabric. By adjusting the position of the block in the segmental slot 45, the length of the stroke of the ruffling blade may be varied so that shallow ruffling may be made or the fabric laid in folds. This ruffling mechanism is especially adapted for stitching the ruffle on the bottom of a petticoat or the like. This strip may be ruffled very little if desired. These strips are circular or continuous, and as the stitching of the article proceeds, the point where the stitching began will approach the receiving end of the folder. The operator may quickly throw the separating blade and folder to one side, withdrawing the same from between the upper section of the fabric and the body of the fabric and the guiding of the article may be completed by hand. By the mechanism above described, it will also be noted that the ruffling blade is positively vibrated by a relatively few number of parts between the ruffling blade and the rock shaft at the rear side of the machine. This does away with lost motion so that the ruffling blade may be accurately given very small movements for what is known as "shallow ruffling." The particular construction of the presser foot and the separating blade coöperate with the ruffling blade in holding the fabric for this shallow ruffling so that the gathers may be very small and may be maintained in the fabric until stitched.

It is obvious that minor changes in the details of construction may be made without departing from the spirit of the invention as set forth in the appended claims.

Having thus described the invention, what is claimed as new is:—

1. The combination of a work support, an overhanging arm, stitch forming mechanism including a needle, means for gathering a fabric in advance of the needle including a gathering blade, a separating blade coöperating with the gathering blade, a folder for turning the edge of the fabric to be gathered, said folder being independent of the separating blade and disposed above the same, and means for suspending said separating blade and folder from the overhanging arm whereby a clearance space is provided between the separating blade and the work support, said supporting means for the separating blade and folder including devices whereby said separating blade and folder may move at the will of the operator away from the needle and to one side of the line of feed.

2. The combination of a work support, an overhanging arm, stitch forming mechanism including a needle, means for gathering a fabric in advance of the needle including a gathering blade, a vibrating lever pivotally supported by the overhanging arm and carrying said blade, a separating blade carried by the overhanging arm and spaced above the work support, a folder carried by the overhanging arm and spaced above the separating blade, said gathering blade being pivoted to said vibrating lever, and means for yieldingly pressing said gathering blade against the separating blade.

3. The combination of a work support, an overhanging arm, switch forming mechanism including a needle, a presser foot, a presser bar carrying said presser foot, a bracket mounted on the presser bar and through which said presser bar is movable, means for holding the bracket from movement with the presser bar, a lever pivoted to said bracket, means for vibrating said lever, and a gathering blade carried by said lever.

4. The combination of a work support, an overhanging arm, stitch forming mechanism including a needle, a presser foot, a presser bar carrying said presser foot, a bracket mounted on the presser bar and through which said presser bar is movable, means for holding the bracket from movement with the presser bar, a lever pivoted to said bracket, means for vibrating said lever, a gathering blade pivoted at the lower end of said lever, and a spring for normally pressing said gathering blade toward the work support.

5. The combination of a work support, an overhanging arm, stitch forming mechanism including a needle, a presser foot, a presser bar carrying said presser foot, a bracket mounted on the presser bar and through which said presser bar is movable, means for holding the bracket from movement with the presser bar, a lever pivoted to said bracket, means for vibrating said lever, a gathering blade pivoted at the lower end of said lever, a spring for normally pressing said gathering blade toward the work support, and a separating blade carried by the overhanging arm with which said gathering blade coöperates.

6. The combination of a work support, an overhanging arm, stitch forming mechanism including a needle, a presser foot, a presser bar carrying said presser foot, a bracket mounted on the presser bar and through which said presser bar is movable, means for holding the bracket from movement with the presser bar, a lever pivoted to said bracket, means for vibrating said lever, a gathering blade pivoted at the lower end of said lever, a spring for normally pressing said gathering blade toward the work support, a separating blade and a folder carried by the overhanging arm, said separating blade and folder being spaced from the work support whereby a fabric to which the ruffled strip is to be attached may be passed underneath said separating blade and folder, said separating blade normally extending underneath the gathering blade, and means whereby the operator may move said separating blade and said folder away from the needle and at one side of the line of feed.

7. The combination of a work support, an overhanging arm, stitch forming mechanism including a needle, a bracket supported by said overhanging arm, a lever pivoted to said bracket, a gathering blade pivoted to said lever for gathering the fabric in advance of said needle, a slotted segment carried by said bracket, a link pivoted at one end to said lever and having an adjustable connection with said slotted segment, a rock shaft carried by said overhanging arm, means for rocking said shaft, said rock shaft having a depending arm at its outer end, and a link for connecting said depending arm to said slotted segment.

8. The combination of a work support, an overhanging arm, stitch forming mechanism including a needle, a bracket supported by said overhanging arm, a lever pivoted to said bracket, a gathering blade pivoted to said lever for gathering the fabric in advance of said needle, a slotted segment carried by said bracket, a link pivoted at one end to said lever and having an adjustable connection with said slotted segment, a rock shaft carried by said overhanging arm, means for rocking said shaft, said rock shaft having a depending arm at its outer end, a link for connecting said depending arm to said slotted segment, and a separating blade carried by said overhanging arm and extending underneath said gathering blade, said separating blade being spaced from the work support.

9. The combination of a work support, an overhanging arm, stitch forming mechanism including a needle, means supported by the overhanging arm for gathering the fabric in advance of the needle, said means including a gathering blade, a separating blade, an arm adjustably supported by the overhanging arm of the machine, and means for pivotally supporting said separating blade from said arm whereby said separating blade may be moved away from the needle and to one side of the line of feed.

10. The combination of a work support, an overhanging arm, stitch forming mechanism including a needle, means supported by the overhanging arm for gathering the fabric in advance of the needle, said means including a gathering blade, a separating blade, an arm adjustably supported by the overhanging arm of the machine, means for pivotally supporting said separating blade from said arm whereby said separating blade may be moved away from the needle and to one side of the line of feed, and a spring latch for normally holding the separating blade adjacent the needle.

11. The combination of a work support, an overhanging arm, stitch forming mechanism including a needle, means for gathering a fabric in advance of the needle including a gathering blade, said gathering means being supported by the overhanging arm, a separating blade with which said gathering blade coöperates, an arm, means for supporting said arm from the overhanging arm of the machine whereby the same may be adjusted vertically, said supporting arm having a horizontally disposed section, a supporting shank to which said separating blade is attached, means for pivotally connecting said supporting shank to the horizontally disposed section of the arm, said shank having an overhanging member engaging the horizontal section of the arm, and a spring clip for operating said overhanging member for normally holding the separating blade adjacent the needle.

12. The combination of a work support, an overhanging arm, stitch forming mechanism including a needle, a presser foot having its main portion in rear of the needle, said presser foot having a cut-away portion at its forward end slotted for the needle, a gathering blade, a folder, a separating blade located beneath the gathering blade and folder, means for suspending the gathering blade from the overhanging arm whereby said separating blade is spaced from the work support, said gathering blade being yieldingly pressed against said separating blade, said separating blade being so disposed as to project underneath the forward end of the presser foot and having a slot for the needle, the forward end of said separating blade being spaced slightly from the forward end of the presser foot.

In testimony whereof, we affix our signatures in the presence of two witnesses.

LANSING ONDERDONK.
AUGUST JOHN WOHLPART.

Witnesses:
FRED VESLY MEYER,
J. H. HOWELL.

Copies of this patent may be obtained for five cents each, by addressing the "Commissioner of Patents, Washington, D. C."